United States Patent
Zacharias et al.

(10) Patent No.: US 11,822,464 B2
(45) Date of Patent: Nov. 21, 2023

(54) VIDEO-BASED USER INTERFACE APPLICATION TESTING

(71) Applicant: International Business Machines Corporation, Armonk, NY (US)

(72) Inventors: Shinoj Zacharias, Bangalore (IN); Vijay Ekambaram, Chennai (IN); Vittal Ramakanth Pai, Tumkur District (IN)

(73) Assignee: International Business Machines Corporation, Armonk, NY (US)

( * ) Notice: Subject to any disclaimer, the term of this patent is extended or adjusted under 35 U.S.C. 154(b) by 174 days.

(21) Appl. No.: 17/509,181

(22) Filed: Oct. 25, 2021

(65) Prior Publication Data

US 2023/0126502 A1    Apr. 27, 2023

(51) Int. Cl.
*G06F 11/36* (2006.01)
*G06F 3/04842* (2022.01)
*G06F 3/0482* (2013.01)

(52) U.S. Cl.
CPC ........ *G06F 11/3688* (2013.01); *G06F 3/0482* (2013.01); *G06F 3/04842* (2013.01); *G06F 11/3684* (2013.01); *G06F 11/3692* (2013.01)

(58) Field of Classification Search
CPC ............. G06F 11/3688; G06F 11/3684; G06F 11/3692; G06F 3/0482; G06F 3/04842
See application file for complete search history.

(56) References Cited

U.S. PATENT DOCUMENTS

| | | |
|---|---|---|
| 8,117,591 B1 | 2/2012 | Michelsen |
| 10,664,267 B2 | 5/2020 | Ekambaram |

(Continued)

FOREIGN PATENT DOCUMENTS

| | | | |
|---|---|---|---|
| CN | 110209581 A | * | 9/2019 |
| CN | 112612690 A | * | 4/2021 |
| WO | 2020233331 A1 | | 11/2020 |

OTHER PUBLICATIONS

Hyunjun Jung et al. "An Image Comparing-based GUI Software Testing Automation System", [Online], pp. 1-5, [Retreived from Interent on Jul. 15, 2023], <http://worldcomp-proceedings.com/proc/p2012/SER4103.pdf>, (Year: 2012).*

(Continued)

*Primary Examiner* — Ziaul A Chowdhury
(74) *Attorney, Agent, or Firm* — Edward J. Wixted, III

(57) ABSTRACT

Described herein are methods, computer program products, and computer systems for video-based user interface (UI) application testing. The method includes receiving first test video data corresponding to test video images of an application executing on a first UI, generating the test video images on a first display, generating application video images on a second display. Further, the method may include determining that a first frame of the test video images and a second frame of the application video images fail to satisfy a predetermined similarity threshold, generating a third UI comprising the second frame of the second UI on a third display, receiving user inputs at the third UI for a first duration, capturing replacement test video images from the third display for the first duration, and generating second test video images, wherein the first frame of the test video images is replaced by the replacement test video images.

20 Claims, 5 Drawing Sheets

(56) References Cited

U.S. PATENT DOCUMENTS

| | | |
|---|---|---|
| 2015/0378876 A1 | 12/2015 | Ji |
| 2018/0189170 A1 | 7/2018 | Dwarakanath |
| 2020/0159647 A1 | 5/2020 | Puszkiewicz |
| 2022/0138086 A1* | 5/2022 | Ben Zur ............... G06N 20/00 717/125 |

OTHER PUBLICATIONS

Gibbs, Louise, "Adapting Recorded Test Cases to Improve Your Test Automation", TestProject, Feb. 14, 2019, 9 Pages.

Hametner et al., "The Adaptation of Test-Driven Software Processes to Industrial Automation Engineering", 2010 8th IEEE International Conference on Industrial Informatics, Osaka, Japan, Jul. 13-16, 2010, 7 Pages.

Mirzaaghaei et al., "Supporting Test Suite Evolution through Test Case Adaptation", 2012 IEEE Fifth International Conference on Software Testing, Verification and Validation, Montreal, QC, Canada, Apr. 17-21, 2012, 10 Pages.

Testim, "Record and Playback Testing in 2020: It's Come a Long Way", © testim, Apr. 3, 2020, 10 Pages.

Tuovenen et al., "MAuto: Automatic Mobile Game Testing Tool Using Image-Matching Based Approach", The Computer Games Journal 8(10), Oct. 19, 2019, 25 Pages.

Yu et al., "Layout and Image Recognition Driving Cross-Platform Automated Mobile Testing", arXiv:2008.05182v3 [cs.SE], Feb. 22, 2021, 11 Pages.

\* cited by examiner

VIDEO-BASED USER INTERFACE APPLICATION TESTING

BACKGROUND

The present invention relates generally to the field of software testing, and more particularly to video-based user interface (UI) application testing.

Designing formal test cases involve incorporating and executing techniques to record the testing process as a video and enable test-replay based on the recorded video using image recognition processes. Enabling test-automation techniques via extracting objects and events are dependent on the chosen programming language, while performing image recognition-based techniques on the recorded video are more generic and independent of the programming language. Thus, application testing using a testing agent on a mobile device will simulate the same actions on the target objects based on the actions enabled in each frame of the recorded video.

SUMMARY

The present invention is described in various embodiments disclosing computer-implemented methods, computer program products, and computer systems for video-based user interface (UI) application testing. An embodiment of the present disclosure provides a computer-implemented method for video-based UI application testing including one or more processors configured for receiving first test video data corresponding to test video images of an application executing on a first UI, generating the test video images on a first display based on the first video test data, and generating application video images on a second display based on application video data corresponding to the application executing on a second UI.

Further, the computer-implemented method may include one or more processors configured for determining that a first frame of the test video images and a second frame of the application video images fail to satisfy a predetermined similarity threshold, generating a third UI comprising the second frame of the second UI on a third display based on the application video data, receiving user inputs at the third UI for a first duration, capturing replacement test video images from the third display for the first duration, and generating second test video images based on the test video images and the replacement test video images, wherein the first frame of the test video images is replaced by the replacement test video images.

DETAILED DESCRIPTION

Figure 1:
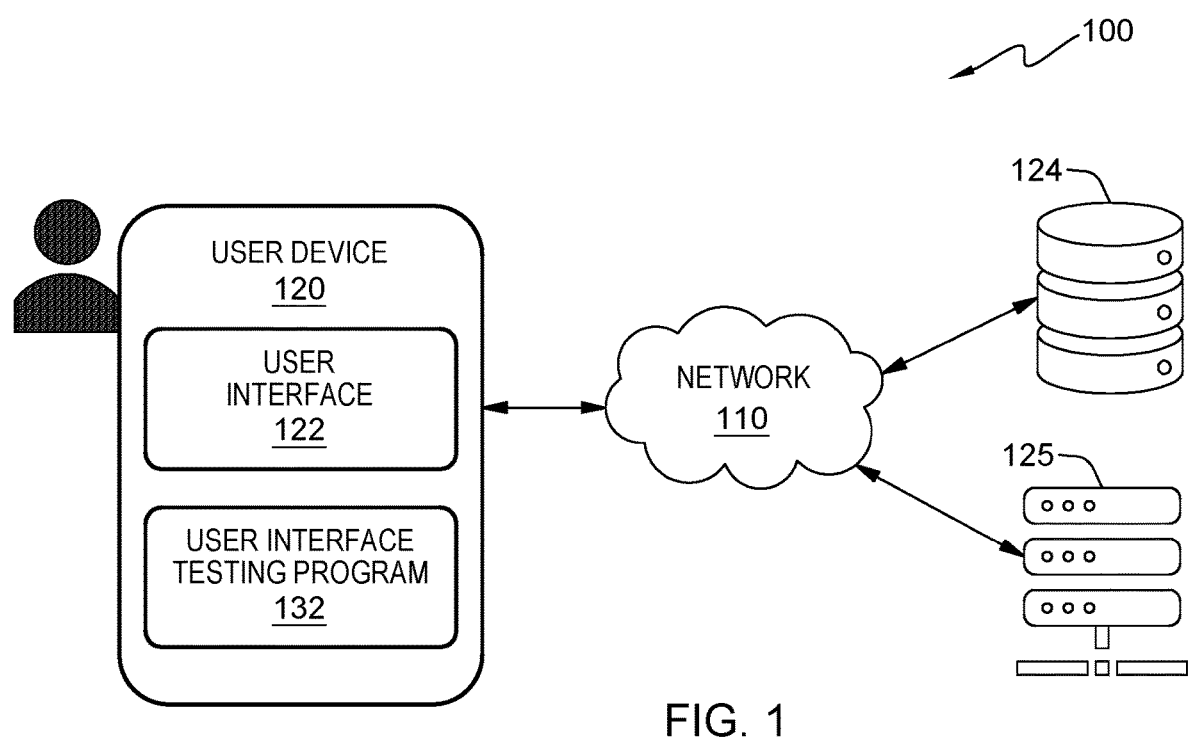
FIG. 1 is a functional block diagram illustrating a distributed data processing environment, in accordance with an embodiment of the present invention.

Many challenges exist to create formal test cases for software application testing because of the countless variables that that must be considered to ensure viability and a satisfactory user experience. Embodiments of the present invention recognize that, during software application testing, whenever the appearance of the application user interface (UI) is changed due to a software update, the previously recorded testing video is rendered out-of-date or expired. Since UI changes occur often during the testing process, a new testing video must be recorded for every major UI change to achieve effective test playback. While test-case adaptation techniques are common in object-based-test-automation, many challenges arise to adapt object-based techniques to video-based-testing as current testing is performed at the image level rather than the object level.

Embodiments of the present invention provide computer-implemented methods, computer systems, and computer program products for video-based UI application testing. In an embodiment, the computer-implemented method may include one or more processors configured to enable a user (e.g., test engineer) to record a video on a user device when executing a UI test on a software application. For example, the computer-implemented method may be configured to enable test-replay on a software application using image recognition techniques on the recorded test video. However, if the application is changed or updated due to an installed software update, then the recorded test video will no longer be valid for testing purposes.

In an embodiment, the computer-implemented method may be configured to identify a difference between the UI displayed in the recorded test video and the UI in a newly (modified) updated software application. Once the difference is identified, the computer-implemented method may be configured to trigger a virtual mirror session via displays of the user device with the user (e.g., test engineer) to resolve the difference between the two UIs. For example, while the modified application UI is displayed to the user, a video of the user actions within the modified application UI may be captured (or recorded) as a video snippet. The video snippet may then be inserted into the recorded test video to replace the obsolete video portions with the modified video portions, including the video snippet. Thus, the old, recorded test video will be automatically adapted to enable testing on the modified software application.

In another embodiment, a computer-implemented method for auto-triggering virtual screen mirroring for use by application test personnel is described. During testing, user interactions may be captured as a short video snippet including specific video frame points (e.g., frames at which a UI conflict is identified between the recorded test video and a current UI). The computer-implemented method may also be configured to augment the captured user interactions to the original recorded test video to enable playback testing on adapted (or updated) software application versions. Therefore, by automating a timely intervention in test-playback to capture human actions performed within the application UI, the old, recorded test video is augmented with updated video snippets to enable full playback on the updated software application UI.

In an embodiment, the computer-implemented method may be configured to enable a user (e.g., test engineer) to generate a test of a login scenario for a first version of the application by recording a video of the application UI executing. Further, the computer-implemented method may be configured to determine that further tests performed on a second version of the application are failing due to a change in the UI of the second version of the application compared to the UI of the first version of the application. Test playback failures can occur for various reasons, including a change in the UI login functionality. Therefore, the recorded test video will be no longer compatible with the second modified version of the application.

In an embodiment, the computer-implemented method may be configured to compare the recorded frame of the recorded test video of the UI page and the current frame of the second version of the application UI. In an embodiment, the computer-implemented method may be configured to determine a difference between the UI of the modified application as compared to the UI in the recorded test video. Once the difference is determined, the computer-implemented method may be configured to trigger the virtual mirror session causing the one or more processors to display the difference, along with specific video frame points, on one or more displays of the user device to the user. Once the user can view and observe the displayed differences, the computer-implemented method may be configured to receive user inputs corresponding to actions corresponding to the user resolving the difference on the second version of the application UI. Further, the computer-implemented method may be configured to capture a video recording of the user inputs as generated on the display as a separate video snippet.

In an embodiment, the computer-implemented method may be configured to augment the separate video snippet into all the old, recorded test videos by replacing the frame corresponding to the failed steps with the separate video snippets. Therefore, the old, recorded test videos and corresponding tests are no longer invalid and may now be easily adapted to enable testing on the second version of the application.

The present invention will now be described in detail with reference to the Figures.

FIG. 1 is a functional block diagram illustrating a distributed data processing environment 100, in accordance with an embodiment of the present invention. FIG. 1 provides only an illustration of one embodiment of the present invention and does not imply any limitations with regard to the environments in which different embodiments may be implemented. In the depicted embodiment, environment 100 includes computing device 120, server 125, database 124, interconnected over network 110. Network 110 operates as a computing network that can be, for example, a local area network (LAN), a wide area network (WAN), or a combination of the two, and can include wired, wireless, or fiber optic connections. In general, network 110 can be any combination of connections and protocols that will support communications between computing device 120, server 125, and database 124. Environment 100 may also include additional servers, computers, sensors, or other devices not shown.

Computing device 120 operates to execute at least a part of a computer program (e.g., UI testing program 132) for video-based UI testing. Computing device 120 may be configured to send and/or receive data from network 110 or from any other device connected to network 110. In some embodiments, computing device 120 may be a management server, a web server, or any other electronic device or computing system capable of receiving and sending data. In some embodiments, computing device 120 may be a laptop computer, tablet computer, netbook computer, personal computer (PC), a desktop computer, a smart phone, or any programmable electronic device capable of communicating with database 124, server 125 via network 110. Computing device 120 may include components as described in further detail in FIG. 5.

Computing device 120 may also be configured to receive, store, and process image data received and generated within environment 100. Computing device 120 may be configured to store the image data in memory of computing device 120 or transmit the image data to database 124 or server 125 via network 110. The image data may be processed by the one or more processors in communication with computing device 120 or by one or more processors associated with server 125 in a cloud computing network.

Database 124 operates as a repository for data flowing to and from network 110. Examples of data include image data, test video data, application video data, and data corresponding to images processed within environment 100. A database is an organized collection of data. Database 124 can be implemented with any type of storage device capable of storing data and configuration files that can be accessed and utilized by computing device 120, such as a database server, a hard disk drive, or a flash memory. In an embodiment, database 124 is accessed by computing device 120 to store data corresponding to images processed within environment 100. In another embodiment, database 124 is accessed by computing device 120 to access device data, network data, and data corresponding to images processed within environment 100. In another embodiment, database 124 may reside elsewhere within environment 100 provided database 124 has access to network 110.

Server 125 can be a standalone computing device, a management server, a web server, or any other electronic device or computing system capable of receiving, sending, and processing data and capable of communicating with computing device 120 via network 110. In other embodiments, server 125 represents a server computing system utilizing multiple computers as a server system, such as a cloud computing environment. In yet other embodiments, server 125 represents a computing system utilizing clustered computers and components (e.g., database server computers, application server computers, etc.) that act as a single pool of seamless resources when accessed within environment 100. Server 125 may include components as described in further detail in FIG. 5.

Figure 2:
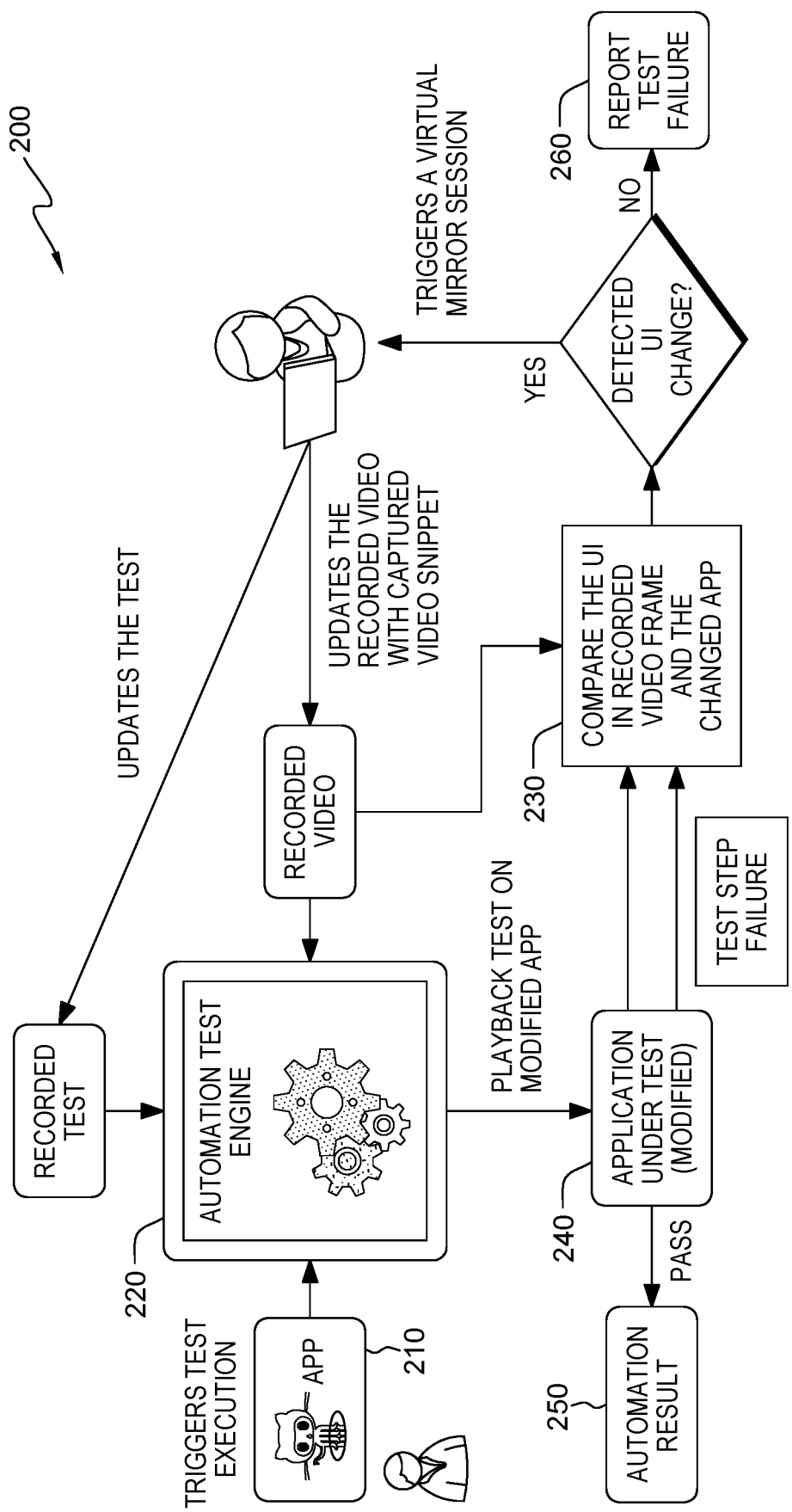
FIG. 2 depicts a flowchart of a system for video-based user interface (UI) application testing, in accordance with an embodiment of the present invention.

FIG. 2 depicts a flowchart of a system 200 for video-based user interface (UI) application testing, in accordance with an embodiment of the present invention.

In an embodiment, system 200 illustrates application 210 to be tested using automation test engine 220. For example, automation test engine 220 may be configured to receive a recorded test video and a recorded test from a user (e.g., test engineer) who performs updates to the recorded test and updates the recorded video with captured video snippets of the updates. Further, system 200 may be configured to compare 230 the UI in the recorded video frame and the changed or modified application to determine if a UI change is detected. If a UI change is detected, then the one or more processors may be configured to automatically trigger a virtual mirror session for display to the user, wherein the user may then be enabled to update the test and update the recorded video with the captured video snippet, as described above herein. If a UI change is not detected, then the one or more processors may be configured to report 260 a test failure.

Further in another embodiment, system 200 may include one or more processors configured to perform playback 240 test on the modified application undergoing testing to determine whether a test step failure exists. If a test step failure is determined to exist, then the one or more processors may be configured to compare 230 the UI in the recorded video frame to the UI in the modified application, as described above herein. If a test step failure is not determined, then the one or more processors may be configured to issue a pass result for the automation result 250.

Figure 3:
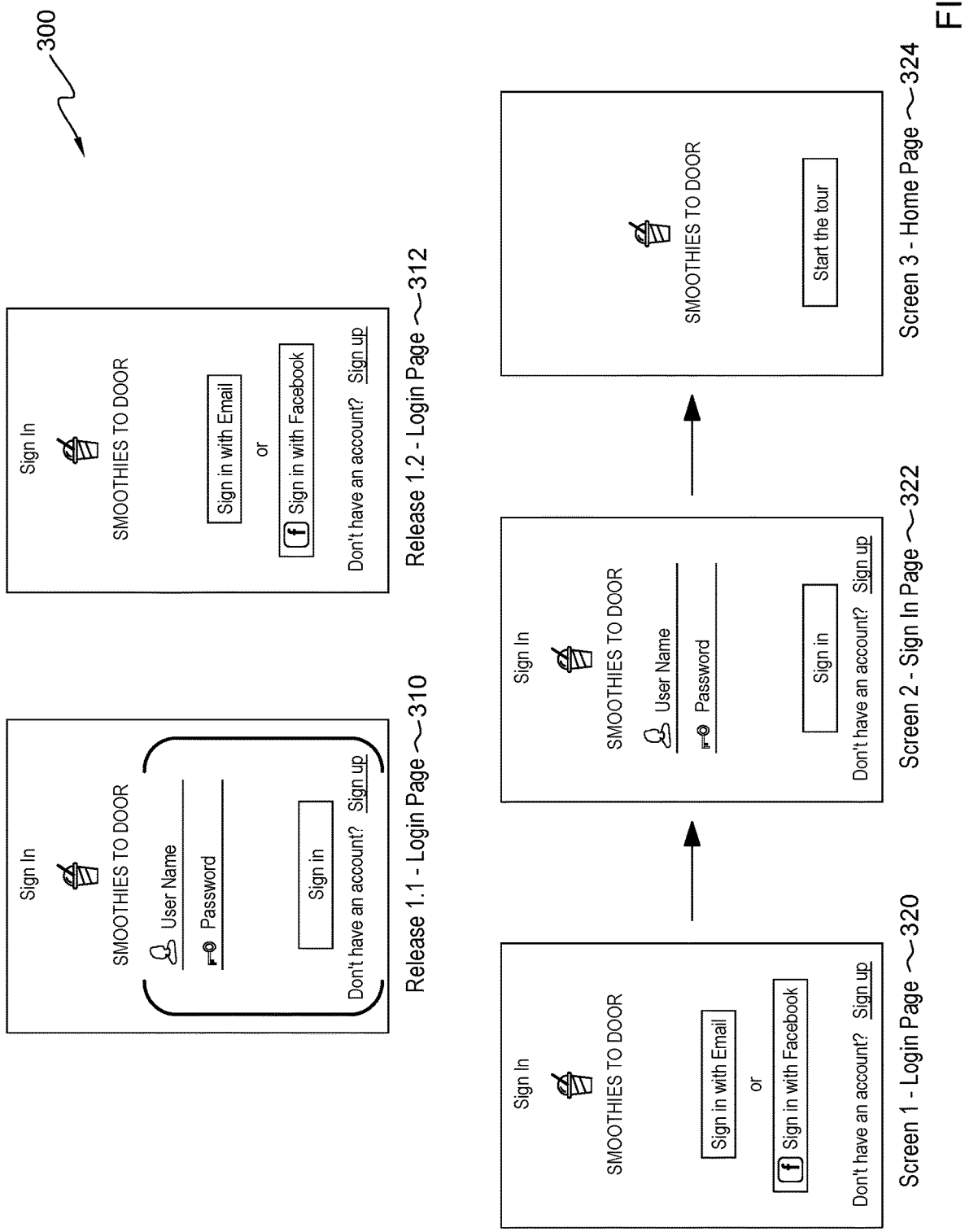
FIG. 3 depicts a process for video-based UI application testing, in accordance with an embodiment of the present invention.

FIG. 3 depicts a process 300 for video-based UI application testing, in accordance with an embodiment of the present invention.

In an embodiment, process 300 may be configured to record a testing video of a first version (e.g., Release 1.1) of the application during testing on the functionality (e.g., Login Scenario). In an embodiment, process 300 may include one or more processors configured for generating a first screen 310 (e.g., Login Page) showing a first frame of the testing video the first display. Further, the one or more processors may be configured for generating a second screen 312 (e.g., Login Page) of a second version (e.g., Release 1.2) of the application UI on a second display to test the functionality (e.g., Login Scenario) of the second version of the application.

In an embodiment, process 300 may be configured to determine that a first frame the UI of the application shown on the first screen 310 in the testing video is different than a second frame of the UI of the modified application shown on the second screen 312, resulting in a failing test because of the change in the UI for the login screen. For example, process 300 may be configured to compare the first frame of the recorded testing video and the second frame of the second frame of the second version of the application UI to identify if a difference between the first frame and the second frame exceeds a similarity threshold. Therefore, the recorded testing video is no longer compatible with the second version of the application UI.

In an embodiment, process 300 may be configured to trigger a virtual mirror session by generating a third screen 320 (e.g., Screen 1—Login Page), a fourth screen 322 (e.g., Screen 2—Sign In Page), and a fifth screen 324 (e.g., Screen 3—Home Page) with specific video frame points to enable the user to resolve the difference by enabling actions on the modified application or second version of the application (e.g., Release 1.2) UI. Further, process 300 may be configured to record the enabling actions as displayed on the screens as a separate video snippet. Further, process 300 may be configured to insert the separate video snippet into the recorded testing video, causing the recorded testing video to be modified by replacing the frame corresponding to the failed test step with the separate video snippet showing the enabling actions. Therefore, the old videos and tests become no longer incompatible due to the frame replacements. Thus, the new modified testing video is compatible with the second version of the application, causing the testing to pass this step of the test.

Figure 4:
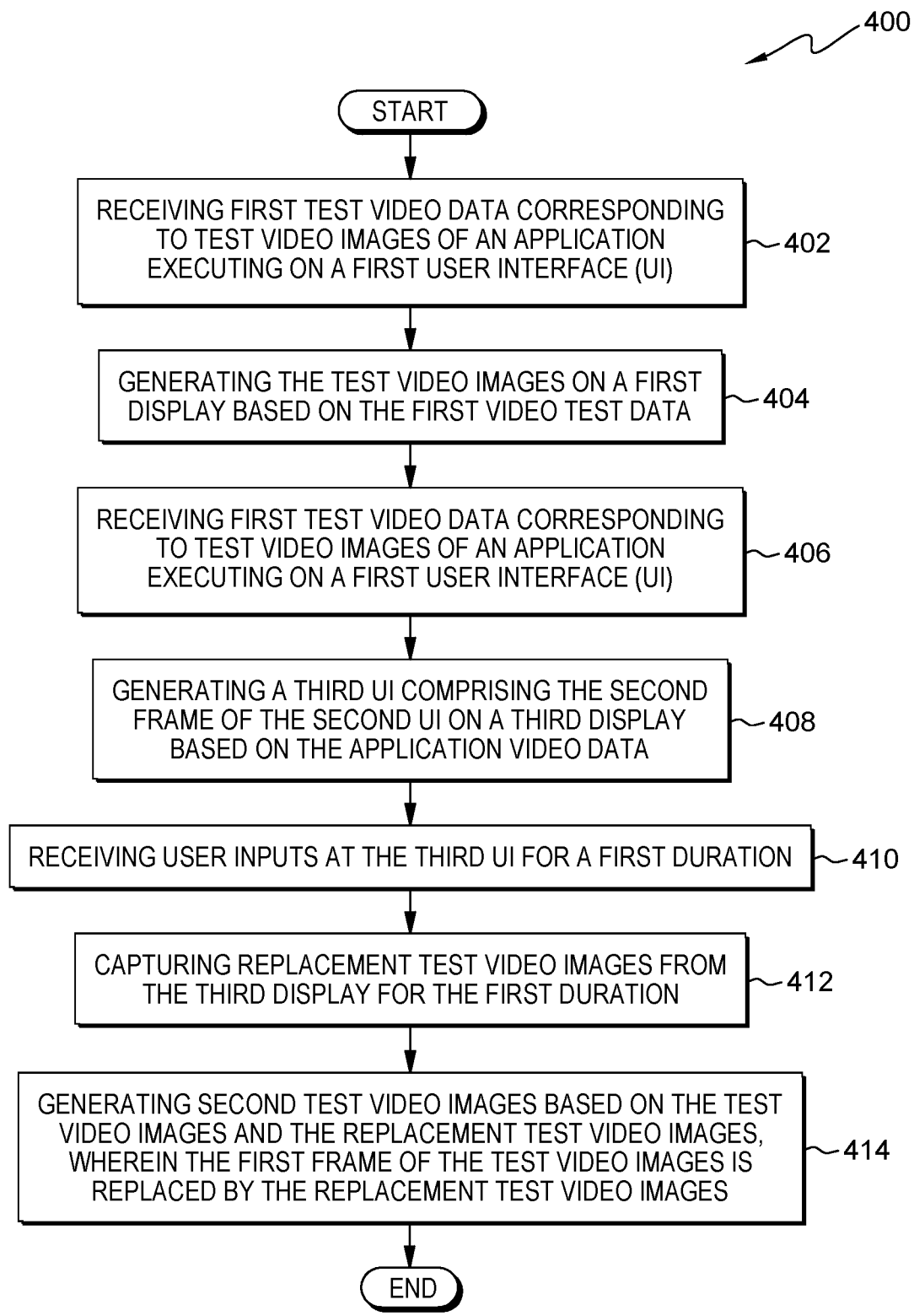
FIG. 4 depicts a flow chart of a computer-implemented method for video-based UI application testing, in accordance with an embodiment of the present invention.

FIG. 4 depicts a flow chart of a computer-implemented method for video-based UI application testing, in accordance with an embodiment of the present invention.

Embodiments of the present invention provide computer-implemented method 400 for video-based UI application testing that includes one or more processors configured for receiving 402 first test video data corresponding to test video images of an application executing on a first UI of a user device, generating 404 the test video images on a first display of the user device based on the first video test data, generating 406 application video images on a second display of the user device based on application video data corresponding to the application executing on a second UI of the user device. Further, computer-implemented method 400 may include one or more processors configured for determining 408 that a first frame of the test video images and a second frame of the application video images fail to satisfy a predetermined similarity threshold, generating 410 a third UI of the user device comprising the second frame of the second UI on a third display of the user device based on the application video data, receiving 412 user inputs at the third UI for a first duration, capturing 414 replacement test video images from the third display for the first duration, and generating 416 second test video images based on the test video images and the replacement test video images, wherein the first frame of the test video images is replaced by the replacement test video images.

In an embodiment, computer-implemented method 400 may further include one or more processors configured to determine a first score for the first frame and a second score for the second frame, generate a first similarity threshold based on a comparison between the first score and the second score, and determine that the condition is satisfied if the first similarity threshold is less than a predetermined threshold.

In an embodiment, the user inputs may correspond to specific instructions executed by a user to perform one or more actions. For example, the one or more actions may include click one or more user-selectable icons displayed on the third UI, enter text characters into one or more fields displayed in the third UI, and to visually verify one or more UI icons are displayed on the third UI.

In an embodiment, the first duration may begin at a first time after the third UI is generated on the third display and may end at a second time after no more user inputs are detected. The first duration and the second duration may be of any time duration sufficient to capture the one or more actions by the user. For example, the first time may be less than 2 seconds and the second time may also be less than 2 seconds. Other time durations may be used so long as all of the user actions are captured by the screen recording.

Figure 5:
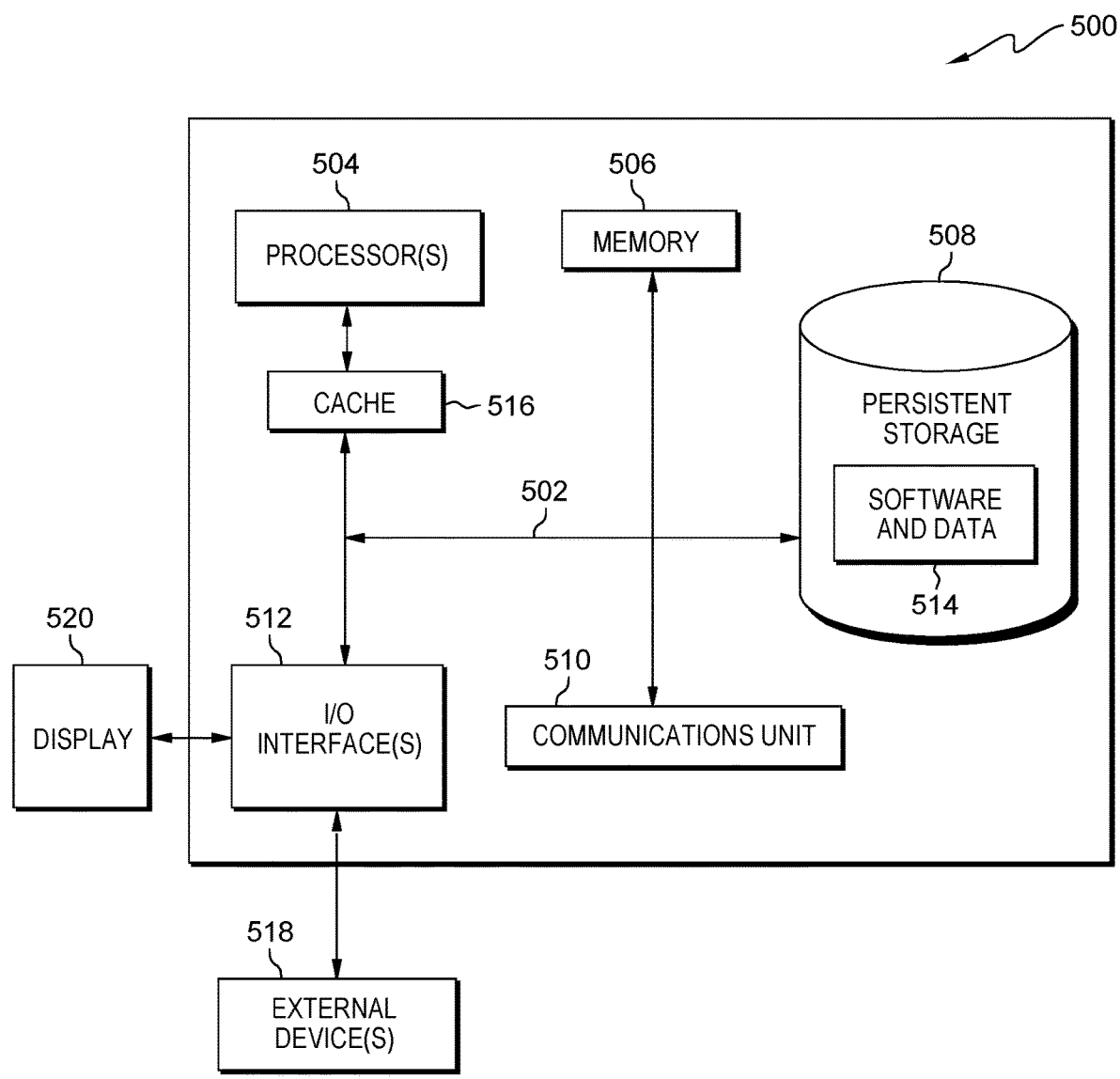
FIG. 5 depicts a block diagram of components of the server computer executing the UI testing program within the distributed data processing environment of FIG. 1, in accordance with an embodiment of the present invention.

FIG. 5 depicts a block diagram of components of the server computer executing the UI testing program within the distributed data processing environment of FIG. 1, in accordance with an embodiment of the present invention. It should be appreciated that FIG. 5 provides only an illustration of one implementation and does not imply any limitations with regard to the environments in which different embodiments may be implemented. Many modifications to the depicted environment may be made.

Computing device 500 includes communications fabric 502, which provides communications between cache 516, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses or a crossbar switch.

Memory 506 and persistent storage 508 are computer readable storage media. In this embodiment, memory 506 includes random access memory (RAM). In general, memory 506 can include any suitable volatile or non-volatile computer readable storage media. Cache 516 is a fast memory that enhances the performance of computer processor(s) 504 by holding recently accessed data, and data near accessed data, from memory 506.

Programs may be stored in persistent storage 508 and in memory 506 for execution and/or access by one or more of the respective computer processors 504 via cache 516. In an embodiment, persistent storage 508 includes a magnetic hard disk drive. Alternatively, or in addition to a magnetic hard disk drive, persistent storage 508 can include a solid-state hard drive, a semiconductor storage device, read-only memory (ROM), erasable programmable read-only memory (EPROM), flash memory, or any other computer readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Programs, as described herein, may be downloaded to persistent storage 508 through communications unit 510.

I/O interface(s) 512 allows for input and output of data with other devices that may be connected to computing device 500. For example, I/O interface 512 may provide a connection to external devices 518 such as image sensor, a keyboard, a keypad, a touch screen, and/or some other suitable input device. External devices 518 can also include portable computer readable storage media such as, for example, thumb drives, portable optical or magnetic disks, and memory cards. Software and data 514 used to practice embodiments of the present invention can be stored on such portable computer readable storage media and can be loaded onto persistent storage 508 via I/O interface(s) 512. I/O interface(s) 512 also connect to a display 520.

Display 520 provides a mechanism to display data to a user and may be, for example, a computer monitor.

Software and data 514 described herein is identified based upon the application for which it is implemented in a specific embodiment of the invention. However, it should be appreciated that any particular program nomenclature herein is used merely for convenience, and thus the invention should not be limited to use solely in any specific application identified and/or implied by such nomenclature.

The present invention may be a computer system, a computer-implemented method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method, comprising:
    receiving, by one or more processors, first test video data corresponding to test video images of an application executing on a first user interface (UI) of a user device;
    generating, by one or more processors, the test video images on a first display of the user device based on the first video test data;
    generating, by one or more processors, application video images on a second display of the user device based on application video data corresponding to the application executing on a second UI of the user device;
    determining, by one or more processors, that a first frame of the test video images, and a second frame of the application video images, satisfy a first condition;
    generating, by one or more processors, a third UI comprising the second frame of the second UI on a third display of the user device based on the application video data;
    receiving, by one or more processors, user inputs at the third UI for a first duration;
    capturing, by one or more processors, replacement test video images from the third display for the first duration; and
    generating, by one or more processors, second test video images based on the test video images and the replacement test video images, wherein the first frame of the test video images is replaced by the replacement test video images.

2. The computer-implemented method of claim 1, further comprising:
    determining, by one or more processors, a first score for the first frame and a second score for the second frame;
    generating, by one or more processors, a first similarity threshold based on a comparison between the first score and the second score; and
    determining, by one or more processors, that the condition is satisfied if the first similarity threshold is less than a predetermined threshold.

3. The computer-implemented method of claim 1, wherein the user inputs correspond to specific instructions executed by a user to click one or more user-selectable icons displayed on the third UI.

4. The computer-implemented method of claim 1, wherein the user inputs correspond to specific instructions executed by a user to enter text characters into one or more fields displayed in the third UI.

5. The computer-implemented method of claim 1, wherein the user inputs correspond to specific instructions executed by a user to visually verify one or more UI icons are displayed on the third UI.

6. The computer-implemented method of claim 1, wherein the first duration begins at a first time after the third UI is generated on the third display and ends at a second time after no more user inputs are detected.

7. The computer-implemented method of claim 6, wherein the first time is less than 2 seconds and the second time is less than 2 seconds.

8. A computer-program product, the computer program product comprising:
    one or more computer readable storage media and program instructions collectively stored on the one or more computer readable storage media, the stored program instructions comprising program instructions to perform a computer-implemented method comprising:
        program instructions to receive first test video data corresponding to test video images of an application executing on a first user interface (UI) of a user device;
        program instructions to generate the test video images on a first display of the user device based on the first video test data;
        program instructions to generate application video images on a second display of the user device based on application video data corresponding to the application executing on a second UI of the user device;

program instructions to determine that a first frame of the test video images, and a second frame of the application video images, satisfy a first condition;

program instructions to generate a third UI comprising the second frame of the second UI on a third display of the user device based on the application video data;

program instructions to receive user inputs at the third UI for a first duration;

program instructions to capture replacement test video images from the third display for the first duration; and program instructions to generate second test video images based on the test video images and the replacement test video images, wherein the first frame of the test video images is replaced by the replacement test video images.

9. The computer program product of claim 8, further comprising:

program instructions to determine a first score for the first frame and a second score for the second frame;

program instructions to generate a first similarity threshold based on a comparison between the first score and the second score; and program instructions to determine that the condition is satisfied if the first similarity threshold is less than a predetermined threshold.

10. The computer program product of claim 8, wherein the user inputs correspond to specific instructions executed by a user to click one or more user-selectable icons displayed on the third UI.

11. The computer program product of claim 8, wherein the user inputs correspond to specific instructions executed by a user to enter text characters into one or more fields displayed in the third UI.

12. The computer program product of claim 8, wherein the user inputs correspond to specific instructions executed by a user to visually verify one or more UI icons are displayed on the third UI.

13. The computer program product of claim 8, wherein the first duration begins at a first time after the third UI is generated on the third display and ends at a second time after no more user inputs are detected.

14. The computer program product of claim 13, wherein the first time is less than 2 seconds and the second time is less than 2 seconds.

15. A computer system, the computer system comprising:
one or more computer processors;
one or more computer readable storage media;
program instructions collectively stored on the one or more computer readable storage media for execution by at least one of the one or more computer processors, the stored program instructions comprising program instructions to perform a computer-implemented method comprising:

program instructions to receive first test video data corresponding to test video images of an application executing on a first user interface (UI) of a user device;

program instructions to generate the test video images on a first display of the user device based on the first video test data;

program instructions to generate application video images on a second display of the user device based on application video data corresponding to the application executing on a second UI of the user device;

program instructions to determine that a first frame of the test video images, and a second frame of the application video images, satisfy a first condition;

program instructions to generate a third UI comprising the second frame of the second UI on a third display of the user device based on the application video data;

program instructions to receive user inputs at the third UI for a first duration;

program instructions to capture replacement test video images from the third display for the first duration; and program instructions to generate second test video images based on the test video images and the replacement test video images, wherein the first frame of the test video images is replaced by the replacement test video images.

16. The computer system of claim 15, further comprising:

program instructions to determine a first score for the first frame and a second score for the second frame;

program instructions to generate a first similarity threshold based on a comparison between the first score and the second score; and program instructions to determine that the condition is satisfied if the first similarity threshold is less than a predetermined threshold.

17. The computer system of claim 15, wherein the user inputs correspond to specific instructions executed by a user to click one or more user-selectable icons displayed on the third UI.

18. The computer system of claim 15, wherein the user inputs correspond to specific instructions executed by a user to enter text characters into one or more fields displayed in the third UI.

19. The computer system of claim 15, wherein the user inputs correspond to specific instructions executed by a user to visually verify one or more UI icons are displayed on the third UI.

20. The computer system of claim 15, wherein the first duration begins at a first time that is less than 2 seconds after the third UI is generated on the third display and ends at a second time that is less than 2 seconds after no more user inputs are detected.

* * * * *